(12) United States Patent
Katzer et al.

(10) Patent No.: US 6,699,573 B1
(45) Date of Patent: Mar. 2, 2004

(54) LINER COMPOSITIONS

(75) Inventors: Karin Katzer, Horgen (CH); Wolfgang Quack, Mettmann (DE)

(73) Assignee: Dow Global Technologies Inc., Midland, MI (US)

(*) Notice: Subject to any disclaimer, the term of this patent is extended or adjusted under 35 U.S.C. 154(b) by 0 days.

(21) Appl. No.: 09/622,428

(22) PCT Filed: Feb. 23, 1999

(86) PCT No.: PCT/US99/03911

§ 371 (c)(1),
(2), (4) Date: Aug. 16, 2000

(87) PCT Pub. No.: WO99/47601

PCT Pub. Date: Sep. 23, 1999

Related U.S. Application Data

(60) Provisional application No. 60/078,215, filed on Mar. 16, 1998.

(51) Int. Cl.⁷ .............. B32B 7/00; B32B 5/12; B32B 27/02
(52) U.S. Cl. .............. 428/221; 428/98; 428/109; 428/113; 428/299.7
(58) Field of Search .............. 428/98, 109, 113, 428/221, 299.7

(56) References Cited

U.S. PATENT DOCUMENTS

| | | | |
|---|---|---|---|
| 3,645,992 A | 2/1972 | Elston | 260/80.78 |
| 3,803,067 A | 4/1974 | Kehr et al. | 260/28.5 |
| 4,076,698 A | 2/1978 | Anderson | 526/348.6 |
| 4,242,473 A | 12/1980 | Nametz et al. | 525/397 |
| 4,257,931 A | 3/1981 | Granzow | 260/45.8 |
| 4,278,591 A | 7/1981 | Granzow | 260/45.75 |
| 4,732,921 A | 3/1988 | Hochberg et al. | 523/460 |
| 4,937,299 A | 6/1990 | Ewen et al. | 526/119 |
| 4,950,541 A | 8/1990 | Tabor et al. | 428/373 |
| 5,055,438 A | 10/1991 | Canich | 502/117 |
| 5,064,802 A | 11/1991 | Stevens et al. | 502/155 |
| 5,096,867 A | 3/1992 | Canich | 502/103 |
| 5,132,380 A | 7/1992 | Stevens et al. | 526/126 |
| 5,137,157 A | 8/1992 | Lawson | 211/32 |
| 5,218,071 A | 6/1993 | Tsutsui et al. | 526/348 |
| 5,231,106 A | 7/1993 | Knutsen et al. | 514/340 |
| 5,272,236 A | 12/1993 | Lai et al. | 526/348.5 |
| 5,278,272 A | 1/1994 | Lai et al. | 526/348.5 |
| 5,374,696 A | 12/1994 | Rosen et al. | 526/126 |
| 5,470,993 A | 11/1995 | Devore et al. | 556/11 |
| 5,569,516 A | 10/1996 | Paeglis et al. | 428/58 |
| 5,597,194 A | 1/1997 | Daugherty et al. | 296/39.2 |
| 5,707,732 A | 1/1998 | Sonoda et al. | 428/357 |
| 5,850,798 A | * 12/1998 | Engel | 119/170 |

FOREIGN PATENT DOCUMENTS

| | | | |
|---|---|---|---|
| DE | 44 36 486 A1 | 4/1996 | C08L/23/16 |
| EP | 0 277 003 A1 | 8/1988 | C08F/4/64 |
| EP | 0 468 651 B1 | 1/1992 | C08F/4/74 |
| EP | 0 508 415 B1 | 10/1992 | C08L/23/10 |
| EP | 0 514 828 B1 | 11/1992 | C07F/7/28 |
| EP | 0 520 732 B1 | 12/1992 | C08F/10/00 |
| EP | 0 729 986 A2 | 3/1995 | C08F/210/16 |
| EP | 0 646 623 A2 | 4/1995 | C08L/23/04 |
| GB | 2 214 994 | 9/1989 | F16J/15/10 |
| WO | 95/00683 | 1/1995 | C25B/3/00 |
| WO | WO 96/12762 | 5/1996 | |

OTHER PUBLICATIONS

Journal of Polymer Science: Part A–1, vol. 4, 1966, pps. 881–900.

International Search Report dated Jun. 15, 1999 issued by the EPO acting as the International Searching Authority in PCT/US99/03911.

\* cited by examiner

*Primary Examiner*—Cynthia H. Kelly
*Assistant Examiner*—L. Ferguson

(57) ABSTRACT

The subject invention provides a flexible, protective, integral liner comprising at least one first polymer which is a homogeneous linear or substantially linear ethylene/α-olefin interpolymer having a density of from 0.850 g/cm³ to 0.920 g/cm³, and at least one second polymer which is an ethylene/α-olefin interpolymer having a density of from 0.905 g/cm³ to 0.935 g/cm³, provided that the density or the second polymer is at least 0.002 g/cm³ greater than the density of the first polymer. In preferred embodiments, the liner will further comprise an ignition resistance additive. The liners of the invention exhibit an excellent balance of flexibility and strength, and, when an ignition resistance additive is employed, excellent ignition resistance.

31 Claims, No Drawings

LINER COMPOSITIONS

This application claims the benefit of Provisional application Ser. No. 60/078,215, filed Mar. 16, 1998.

The subject invention pertains to liner compositions. In particular, the subject invention pertains to liner compositions which comprise a first layer and at least one second layer, wherein the first layer comprises at least one homogeneous linear or substantially linear ethylene/α-olefin interpolymer.

Liner compositions have been historically utilized in a variety of application, such as pond liners, roofing membranes, tunnel liners, etc. Such applications typically require a balance of flexibility and impact resistance. In certain of these applications, it is necessary that the liner further comply with certain flame retardancy criteria.

Due to its flexibility and ability to incorporate flame retardants, flexible PVC has found utility in tunnel liner applications. However, PVC is disadvantageous in that it utilizes a plasticizer, which tends to migrate with time and cause a decrease in flexibility; and, in that it exhibits poor low temperature flexibility.

EP 508415-A2 discloses polymeric blends of a propylene homopolymer or copolymer, very low density polyethylene, a modified polymer, and a flame retardant filler. However, as characterized by EP 646623-A2, the compositions do not exhibit high weldability coupled with compliance with the flame retardance test set forth in DIN 4102 B1, both of which are traditionally requirements for use in tunnel liner applications.

EP 646623-A2 discloses polymer compositions useful in tunnel liners, which comprise a blend of two very low density polyethylenes and a flame retardant composition. Exemplified is a blend of a very low density polyethylene having a density of 0.900 g/cm$^3$ and a melt index ($I_2$) of 0.7 g/10 minutes with a very low density polyethylene having a density of 0.885 g/cm$^3$ and a melt index ($I_2$) of 2.5 g/10 minutes. While very low density polyethylene does exhibit somewhat enhanced flexibility as compared to higher density linear low density polyethylene materials, it would be desirable to prepare structures exhibiting a further degree of flexibility, while not sacrificing the good impact resistance which is characteristic of very low density polyethylene.

Accordingly, the subject invention provides a flexible, protective, integral liner comprising:

a. a first polymer component which in turn comprises at least one first ethylene/α-olefin interpolymer which is a homogeneous linear or substantially linear ethylene/α-olefin interpolymer having a density of from 0.850 g/cm$^3$ to 0.920 g/cm$^3$, b. a second polymer component which in turn comprises at least one second ethylene/α-olefin interpolymer having a density of from 0.905 g/cm$^3$ to 0.935 g/cm$^3$ provided that the density of the at least one second ethylene/α-olefin interpolymer is at least 0.002 g/cm$^3$ greater than the density of the at least one first ethylene/α-olefin interpolymer, wherein the liner has a total thickness of 0.3 to 4 mm, and exhibits a flexural modulus, as determined in accordance with ISO 178, of no more than 150 MPa and an Impact Resistance at –10° C., as determined in accordance with ISO 6603, of at least 35 J/mm.

In a preferred embodiment of the invention, the liner will further comprise an ignition resistance additive. In such embodiments, satisfactory flame retardancy (that is, ignition resistance of B1, as determined in accordance with DIN 4102) will preferably be achieved without sacrificing the balance of properties described above. Even more preferably, the satisfactory flame retardancy will be achieved while employing low amount of the ignition resistance additive (that is, no more than 20 weight percent, more preferably no more than 15 weight percent, and most preferably no more than 10 weight percent of a halogenated ingition resistance additive; no more than 35 weight percent, more preferably no more than 30 weight percent non-halogenated ignition resistance additive).

The liners of the invention exhibit outstanding flexibility and mechanical properties, and can be processed on existing polyethylene manufacturing equipment. The liners of the invention which incorporate an ignition resistance additive will further exhibit excellent ignition resistance, will produce lower smoke emissions than flexible PVC liners, and will produce no burning drip while burning.

The liners of the invention will be useful in a variety of applications. In particular, the liners of the invention will be usefully employed to prevent the intrusion of water into buildings or other structures, and thus, to prevent water damage to such buildings or structures. Exemplary applications include, but are not limited to, tunnel liners, pond liners, water barriers, roof liners (particularly for tiled roofs) and geological membranes.

These and other embodiments are described in the following detailed description.

The liner of the invention will comprise at least first and second ethylene/α-olefin interpolymers. The term "interpolymer" is used herein to indicate a copolymer, or a terpolymer, or a higher order polymer. That is, at least one other comonomer is polymerized with ethylene to make the interpolymer. The first and second ethylene/α-olefin interpolymers selected will achieve a balance of properties, for example, an average flexural modulus, as determined in accordance with ISO 178, of no more than 150 MPa, and an Impact Resistance at –10° C., as determined in accordance with ISO 6603, of at least 35 J/mm.

The liner of the invention may comprise a monolayer structure, with the first and second ethylene/α-olefin interpolymers being present as a homogeneous blend, or may comprise at least two layers, with the first and second ethylene/α-olefin interpolymers being present in disparate layers.

While the liner of the invention may be a monolayer, it will preferably comprise at least two layers (referred to herein as an A/B structure). Other structures having more than two layers are possible and will be desirable. One such multilayer structure will employ the same formulations in the layers of the faces of the liner and a different formulation in the interior layer (referred to herein as an A/B/A structure). Preferably, the first ethylene/α-olefin interpolymer will be present in the B layer and the second ethylene/α-olefin interpolymer will be present in the A layer.

The first and second ethylene/α-olefin interpolymers will each be interpolymers of ethylene with at least one comonomer selected from the group consisting of $C_3$–$C_{20}$ α-olefins, non-conjugated dienes, and cycloalkenes. Exemplary $C_3$–$C_{20}$ α-olefins include propylene, isobutylene, 1-butene, 1-hexene, 4-methyl-1-pentene, 1-heptene, and 1-octene. Preferred $C_3$–$C_{20}$ α-olefins include 1-butene, 1-hexene, 4-methyl-1-pentene, 1-heptene, and 1-octene, more preferably 1-hexene and 1-octene. Exemplary cycloalkenes include cyclopentene, cyclohexene, and cyclooctene. The non-conjugated dienes suitable as comonomers, particularly in the making of ethylene/α-olefin/diene terpolymers, are typically non-conjugated dienes having from 6 to 15 carbon atoms. Representative examples of suitable non-conjugated dienes include:

(a) Straight chain acyclic dienes such as 1,4-hexadiene; 1,5-heptadiene; and 1,6-octadiene;
(b) Branched chain acyclic dienes such as 5-methyl-1,4-hexadiene; 3,7-dimethyl-1,6-octadiene; and 3,7-dimethyl-1,7-octadiene;
(c) Single ring alicyclic dienes such as 4-vinylcyclohexene; 1-allyl-4-isopropylidene cyclohexane; 3-allylcyclopentene; 4-allylcyclohexene; and 1-isopropenyl-4-butenylcyclohexene;
(d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; and 5-cyclohexylidene-2-norbornene.

One preferred conjugated diene is piperylene. The preferred dienes are selected from the group consisting of 1,4-hexadiene; dicyclopentadiene; 5-ethylidene-2-norbornene; 5-methylene-2-norbornene; 7-methyl-1,6 octadiene; piperylene; and 4-vinylcyclohexene.

Preferably, the first ethylene/α-olefin interpolymer (that employed in the B layer of an A/B or an A/B/A structure) will be selected to impact flexibility to the liner of the invention. Preferably, the first ethylene/α-olefin interpolymer will have a density of at least 0.855 g/cm$^3$, more preferably at least 0.860 g/cm$^3$, even more preferably at least 0.865 g/cm$^3$ and most preferably at least 0.870 g/cm$^3$. Preferably, the first ethylene/α-olefin interpolymer will have a density of no more than 0.920 g/cm$^3$, more preferably no more than 0.910 g/cm$^3$, even more preferably no more than 0.900 g/cm$^3$, and most preferably no more than 0.890 g/cm$^3$.

Preferably, the second ethylene/α-olefin interpolymer (that employed in the A layer of an A/B or an A/B/A structure) will be selected to impart abuse resistance to the liner of the invention. Preferably, the second ethylene/α-olefin interpolymer will have a density of at least 0.895 g/cm$^3$, more preferably at least 0.900 g/cm$^3$, even more preferably at least 0.905 g/cm$^3$. Preferably, the second ethylene/α-olefin interpolymer will have a density of no more than 0.935 g/cm$^3$, more preferably no more than 0.935 g/cm$^3$, and most preferably no more than 0.920 g/cm$^3$.

It is noted that the second ethylene/α-olefin interpolymer will have a density which is at least 0.002 g/cm$^3$ greater, more preferably at least 0.003 g/cm$^3$ greater than that of the first ethylene/α-olefin interpolymer.

The molecular weight of the ethylene/α-olefin interpolymers will be selected on the basis of attributes which are intended to be imparted to the liner by the presence of that interpolymer. It is well known that the molecular weight of the polymer will correlate with the melt index ($I_2$) of the polymer. Typically, the ethylene/α-olefin interpolymers utilized as the first and second ethylene/α-olefin interpolymers will have a melt index of at least 0.01, preferably at least 0.05, and more preferably at least 0.1 g/10 minutes. Typically, the ethylene/α-olefin interpolymers utilized as the first and second ethylene/α-olefin interpolymers will have a melt index of no more than 30, preferably no more than 20, and most preferably no more than 10 g/10 minutes.

In the embodiment of the invention wherein the liner is a monolayer structure, the liner will comprise a blend of the first and second polymer components. In this embodiment, the blend of the first and second polymer components will in turn comprise the first ethylene/α-olefin interpolymer in an amount of at least 20, more preferably at least 25, and most preferably at least 30 weight percent; preferably no more than 70, more preferably no more than 75, and most preferably no more than 80 weight percent. Further, in this embodiment, the blend of the first and second polymer components will in turn comprise the second ethylene/α-olefin interpolymer an amount of at least 20, more preferably at least 25, and most preferably at least 30 weight percent; preferably no more than 80, more preferably no more than 75, and most preferably no more than 70 weight percent.

In the case of a multilayer structure, each first layer (the B layer in A/B or A/B/A structures) will comprise at least 40 weight percent, more preferably at least 60 weight percent, and most preferably at least 87 weight percent of the first polymer component (which may be the first polymer alone or as present in a homogeneous mixture with a second thermoplastic polymer). Each first layer will comprise no more than 99 weight percent, more preferably no more than 97 weight percent, and most preferably no more than 93 weight percent of the first polymer component.

In the case of a multilayer structure, each second layer (the A layer of an A/B or an A/B/A structure) will comprise at least 40 weight percent, more preferably at least 60 weight percent, and most preferably at least 87 weight percent of the second polymer component. Each second layer will comprise no more than 99 weight percent, more preferably no more than 97 weight percent, and most preferably no more than 93 weight percent of the second polymer component.

In addition to the first and second ethylene/α-olefin interpolymers utilized, either or both of the first and second polymer components may optionally comprise an additional thermoplastic polymer. When the additional thermoplastic polymer forms a part of the first polymer component, the additional thermoplastic polymer will preferably be an additional heterogeneous or homogeneous ethylene/α-olefin interpolymer having a density of from 0.855 to 0.920 g/cm$^3$, more preferably from 0.870 to 0.890 g/cm$^3$ and having a melt index ($I_2$) of from 0.01 to 30, preferably from 0.1 to 10 g/10 minutes. When the additional thermoplastic polymer forms a part of the second polymer component, the additional thermoplastic polymer will preferably be an additional heterogeneous or homogeneous ethylene/α-olefin interpolymer having a density of from 0.855 to 0.920 g/cm$^3$, more preferably from 0.860 to 0.880 g/cm$^3$ and having a melt index ($I_2$) of from 0.01 to 30, preferably from 0.1 to 10 g/10 minutes. While less preferred, the additional thermoplastic polymer may alternatively be a high pressure low density polyethylene or a polypropylene.

In the case of monolayer structures, the blend of the first and second polymer components may comprise, for instance from 0 to 40 weight percent, preferably from 0 to 25 weight percent, and more preferably from 0 to 15 weight percent of the additional thermoplastic polymer.

In the case of multilayer structures, the layer containing the first polymer component (the B layer in A/B and A/B/A structures), may utilize, as the first polymer component, either the first ethylene/α-olefin interpolymer alone or as a blend of the first polymer with from 5 to 75 weight percent, and more preferably from 15 to 65 weight percent, and most preferably from 25 to 60 weight percent of the additional thermoplastic polymer. Likewise, the layer containing the second polymer (the A layer in A/B or A/B/A structures), may utilize, as the second polymer component, either the second polymer alone or as a blend of the second polymer with from 5 to 60 weight percent, preferably from 10 to 50 weight percent, and more preferably from 40 to 50 weight percent of the additional thermoplastic polymer.

In the case of the multilayer structure, it is understood that the selection of the second polymer component of the second layer will be dependent on the selection of the first polymer component of the first layer. That is, if the layer containing the first polymer component (the B layer in A/B or A/B/A structures) consists essentially of the first ethylene/α-olefin interpolymer, the second polymer component may consist essentially of the second ethylene/α-olefin interpolymer, without sacrificing flexibility. However, if the first polymer component comprises a blend of the first ethylene/α-olefin interpolymer with an additional thermoplastic polymer (for instance, when the first polymer component is a blend of a substantially linear ethylene/α-olefin interpolymer (the first ethylene/α-olefin interpolymer) and a heterogeneously branched ethylene/α-olefin interpolymer (the additional thermoplastic polymer)), then the second polymer component shall also be designed to contain an additional thermoplastic polymer (for instance, when the second polymer component is a blend of a heterogeneously branched ethylene/α-olefin interpolymer (the second ethylene/α-olefin interpolymer) with a homogeneously branched ethylene/α-olefin interpolymer (the additional thermoplastic polymer)).

Although the present invention is intended to encompass the structures of the preceding paragraph, for instance, when it is desired to "cut back" the first ethylene/α-olefin interpolymer with a less expensive additional thermoplastic polymer, from a performance standpoint, it is preferred that the first polymer component consist essentially of the first ethylene/α-olefin interpolymer.

The liner of the invention will preferably comprise an ignition resistance additive, suitable to cause the liner to exhibit an ignition resistance of B1, as determined in accordance with DIN 4102. To be designated as having an ignition resistance of B 1, five specimens of a material are prepared having dimensions or 90 mm×190 mm for edge ignition testing and a gauge mark 150 mm from the bottom edge. Each sample is placed in a small, draught-free cabinet having a mirror attached to the back inside wall for observation of the back of the specimen during testing. The air speed in the flue should be between 0.6 m/s and 0.8 m/s, measured in the flue 25 mm above the flange. The cabinet also has a propane burner with an adjustable flame height and positioning means. A specimen holder and frame positions the test specimen within the cabinet. The bottom edge ignition test is performed by positioning the burner so that the flame is applied to the bottom edge of the test specimen. To do so, the specimen and frame are mounted in the cabinet. The burner is positioned vertically with the flame set at a height of 20 mm and then tilted to a 45° angle before being placed in the cabinet. The flame and test specimen are positioned so that the flame is applied to the bottom edge of the specimen at the center of its width and thickness. If the sample is more than 3 mm thick, the flame is applied to the lower surface at the least favorable position in terms of fire response. The front edge of the burner's stabilizer should be 16 mm away from the specimen's bottom edge, measured along the nozzle axis. The flame is applied for 15 seconds before the burner is removed with care not to create any drafts. The time it takes the for the flame tip to reach the gauge mark is measured. Specimens in which the flame does not reach the gauge mark within 20 after the application of the flame are subject to further testing. Further testing is performed on the "Branschacht" apparatus. A B1 designated material will have a value for the residual portion of the sample that is unburned or uncharted that is at least 15 cm with no individual values being less than 0 cm, a mean effluent temperature that does not exceed 200° C. in any test, and the residual length requirement is met for each specimen even where there is afterflame, afterglow, or smoldering.

Exemplary ignition resistance additives include halogenated ignition resistance additives and halogen-free intumescent systems. One preferred halogenated ignition resistance additive is Luvogard MB81/PE, available from Lehmann & Voss, which is a brominated compound (83 percent bromine content), which utilizes antimony trioxide as a synergist. One preferred halogen-free intumenscent system is ethylene-diamine-phosphate (EDAP) or red phosphorous.

When a halogenated ingition resistance additive is employed, it will preferably be provided in an amount of at least 1 weight percent, more preferably at least 3 weight percent, and most preferably at least 5 weight percent; preferably no more than 20 weight percent, more preferably no more than 15 weight percent, and most preferably no more than 10 weight percent.

When a non-halogenated ignition resistance additive is employed, it will preferably be provided in an amount of at least 1 weight percent, more preferably at least 5 weight percent; preferably no more than 35 weight percent, more preferably no more than 30 weight percent.

Preferably, the ignition resistance additive will be present in each layer of the liner.

The liner of the invention will typically have a thickness of at least 0.3 mm, preferably at least 1.0 mm, and most preferably at least 1.5 mm; typically no more than 4 mm, preferably no more than 3 mm, and most preferably no more than 2.5 mm.

The liner of the invention will have a flexural modulus of no more than 150 MPa (which, unless otherwise indicated, is reported as an average between the average machine and cross direction measurements), as determined in accordance with ISO 178.

Preferably, the liner of the invention will be characterized as having a flexural modulus in the machine direction which is within about 30 percent, more preferably within about 25 percent of that in the cross direction. Preferably, in the case of multilayer structures having three or more layers, such as, for example, A/B/A structures, the liner of the invention will have an average flexural modulus in the cross direction of no more than 150 MPa, preferably no more than 130 MPa. Preferably, in the case of multilayer structures having three or more layers, such as, for example, A/B/A structures, the liner of the invention will have an average flexural modulus in the machine direction of no more than 125 MPa, preferably no more than 110 MPa.

Preferably, in the case of multilayer structures having two layers, for example, A/B structures, the liner of the invention will have an average flexural modulus of no more than 100 MPa, preferably no more than 90 MPa (when measured from side of the more flexible B layer). Preferably, in the case of multilayer structures having two layers, for example, A/B structures, the liner of the invention will have an average flexural modulus of no more than 100 MPa, preferably no more than 90 MPa (when measured from the side of the less flexible A layer).

In the more preferred embodiment, wherein the A and B layers each comprise a substantially linear ethylene polymer, the liner of the invention will preferably have a flexural modulus of no more than 100 MPa, preferably no more than 80 MPa, more preferably no more than 60 MPa, and most preferably no more than 50 MPa.

When the liner is a multilayer structure, it may be characterized as having a thickness ratio, which is defined herein to mean the ratio of the thickness of the first layer (the B layer in an A/B or an A/B/A structure) to each second layer (the A layer(s) in an A/B or an A/B/A structure) of from 1:1 to 15:1, preferably from 5:1 to 12:1, and most preferably from 6:1 to 10:1.

Heterogenous polymers are ethylene/α-olefin interpolymers characterized as having a linear backbone and a DSC melting curve having a distinct melting peak greater than 115° C. attributable to a high density fraction. Heterogeneous interpolymers will typically have an $M_w/M_n$ greater than 3 (when the density of the interpolymer is less than about 0.960 g/cm$^3$) and will typically have a CDBI less than or equal to 50, indicating that such interpolymers are a mixture of molecules having differing comonomer contents and differing amounts of short chain branching.

The heterogeneous ethylene/α-olefin interpolymers that can be used in the practice of this invention will be prepared with a coordination catalyst, such as a Ziegler or Phillips catalyst, at a high temperature and a relatively low pressure. Heterogeneous ethylene/α-olefin interpolymers are linear polymers which are characterized as having an absence of long chain branches of polymerized monomer units pendant from the backbone. High density polyethylene (HDPE), generally having a density of 0.941 to 0.965 g/cm$^3$, is typically a homopolymer of ethylene, and it contains relatively few short chain branch chains relative to the various linear interpolymers of ethylene and an α-olefin. HDPE is well known, and is commercially available in various grades.

Linear interpolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (for example, 1-butene, 1-octene, etc.), that has sufficient α-olefin content to reduce the density of the copolymer to a density of from 0.915 to 0.935 g/cm$^3$. When the copolymer contains even more α-olefin, the density will drop below about 0.915 g/cm$^3$ and these copolymers are known as ultra low density polyethylene (ULDPE) or very low density polyethylene (VLDPE).

Heterogeneous ethylene/α-olefin interpolymers are available from The Dow Chemical Company as DOWLEX™ linear low density polyethylene and ATTANE™ ultralow density linear low density polyethylene. Heterogeneous linear ethylene/α-olefin interpolymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al., which is incorporated herein by reference. Preferably, heterogeneous ethylene polymers are typically characterized as having molecular weight distributions, $M_w/M_n$, in the range of from 3.5 to 4.1. Relevant discussions of both of these classes of materials, and their methods of preparation are found in U.S. Pat. No. 4,950,541 and the patents to which it refers, all of which are incorporated herein by reference.

Homogeneous ethylene/α-olefin interpolymers include both homogeneous linear and substantially linear ethylene/α-olefin interpolymers. By the term "homogenous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases.

The homogeneous ethylene/α-olefin interpolymers useful in the invention are characterized as having a narrow molecular weight distribution ($M_w/M_n$). For the homogeneous ethylene/α-olefins useful in the practice of the invention, the $M_w/M_n$ is from 1.5 to 2.5, preferably from 1.8 to 2.2, most preferably about 2.0.

Substantially linear ethylene interpolymers are homogeneous interpolymers having long chain branching. Due to the presence of such long chain branching, substantially linear ethylene interpolymers are further characterized as having a melt flow ratio ($I_{10}/I_2$) which may be varied independently of the polydispersity index, the molecular weight distribution $M_w/M_n$. This feature accords substantially linear ethylene polymers with a high degree of processability despite a narrow molecular weight distribution.

It is noted that substantially linear interpolymers useful in the invention differ from low density polyethylene prepared in a high pressure process. In one regard, whereas low density polyethylene is an ethylene homopolymer having a density of from 0.900 to 0.935 g/cm$^3$, the homogeneous linear and substantially linear interpolymers useful in the invention require the presence of a comonomer to reduce the density to the range of from 0.900 to 0.935 g/cm$^3$.

The long chain branches of substantially linear ethylene interpolymers have the same comonomer distribution as the interpolymer backbone and can be as long as about the same length as the length of the interpolymer backbone. When a substantially linear ethylene/α-olefin interpolymer is employed in the practice of the invention, such interpolymer will be characterized as substituted with from 0.01 to 3 long chain branches per 1000 carbons.

Methods for determining the amount of long chain branching present, both qualitatively and quantitatively, are known in the art.

For determining the presence of long chain branching, see, for example, U.S. Pat. Nos. 5,272,236 and 5,278,272, each of which is incorporated herein by reference. As set forth therein, a gas extrusion rheometer (GER) may be used to determine the rheological processing index (PI), the critical shear rate at the onset of surface melt fracture, and the critical shear stress at the onset of gross melt fracture, as set forth below.

The gas extrusion rheometer useful in the determination of rheological processing index (PI), the critical shear rate at he onset of surface melt fracture, and the critical shear stress at the onset of gross melt fracture, is described by M. Shida, R. N. Shroff, and L. V. Cancio in Polymer Engineering Science, Vol. 17, No. 11, p. 770 (1977), and in "Rheometers for Molten Plastics" by John Dealy, published by Van Nostrand Reinhold co. (1982) on pp. 97–99, each of which is incorporated herein by reference. GER experiments are performed at a temperature of 190° C., at nitrogen pressures between 250 and 5500 psig (between 1.72 and 37.9 MPa) using a 0.0754 mm diameter, 20:1 L/D die with an entrance angle of 180°.

For substantially linear ethylene interpolymers, the PI is the apparent viscosity (in kpoise) of a material measured by GER at an apparent shear stress of 2.15×10$^6$ dynes/cm$^2$ (0.215 MPa). Substantially linear ethylene interpolymers useful in the invention will have a PI in the range of 0.01 kpoise to 50 kpoise, preferably 15 kpoise or less. Substantially linear ethylene interpolymers have a PI which is less than or equal to 70 percent of the PI of a linear ethylene interpolymer (either a Ziegler polymerized polymer or a homogeneous linear ethylene interpolymer) having an $I_2$, $M_w/M_n$, each of which is within 10 percent of that of the substantially linear ethylene interpolymer.

An apparent shear stress versus apparent shear rate plot may be used to identify the melt fracture phenomena and to quantify the critical shear rate and critical shear stress of ethylene polymers. According to Ramamurthy, in the Journal of Rheology, 30(2), 1986, pp. 337–357, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharksin." Herein, as determined using the above-described gas extrusion rheometer, the onset of surface melt fracture is characterized as the beginning of losing extrudate gloss at which the surface roughness of the extrudate can only be detected by magnification at 40 times. The critical shear rate at the onset of surface melt fracture for a substantially linear ethylene interpolymer is at least 50 percent greater than the critical shear rate at the onset of surface melt fracture for a linear ethylene polymer having the same comonomer or comonomers and having an $I_2$, $M_w/M_n$ and density within ten percent of that of the substantially linear ethylene polymer.

Gross melt fracture occurs at unsteady extrusion flow conditions and ranges from regular (alternating rough and smooth, helical, etc.) to random distortions. The critical shear stress at the onset of gross melt fracture of substantially linear ethylene interpolymers, especially those having a density greater than 0.910 g/cm$^3$, is greater than $4\times10^6$ dynes/cm$^2$ (0.4 MPa).

The presence of long chain branching may further be qualitatively determined by the Dow Rheology Index (DRI), which expresses a polymer's "normalized relaxation time as the result of long chain branching." (See, S. Lai and G. W. Knight, ANTEC '93 Proceedings, INSITE™ Technology Polyolefins (SLEP)—New Rules in the Structure/Rheology Relationship of Ethylene α-Olefin Copolymers, New Orleans, La., May 1993. DRI values range from 0 for polymers which do not have any measurable long chain branching, such as Tafmer™ products available from Mitsui Petrochemical Industries and Exact™ products available from Exxon Chemical company) to about 15, and are independent of melt index. In general, for low to medium pressure ethylene polymers, particularly at lower densities, DRI provides improved correlations to melt elasticity and high shear flowability relative to correlations of the same attempted with melt flow ratios. Substantially linear ethylene interpolymers will have a DRI of preferably at least 0.1, more preferably at least 0.5, and most preferably at least 0.8.

DRI may be calculated from the equation:

$$DRI=(3.652879*\tau_o 1.00649/\Lambda_o-1)/10$$

where $\tau_o$ is the characteristic relaxation time of the interpolymer and $\eta_o$ is the zero shear viscosity of the interpolymer. Both $\tau_o$ and $\eta_o$ are the "best fit" values to the Cross equation $$\eta/\eta_o=1/(1+(\gamma^*\tau_o)^{1-n})$$

in which n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160° C. and a gas extrusion rheometer (GER) at extrusion pressures from 1,000 to 5,000 psi (6.89 to 34.5 MPa), which corresponds a shear stress of from 0.086 to 0.43 MPa, using a 0.0754 mm diameter, 20:1 L/D die at 190° C. Specific material determinations may be performed from 140 to 190° C. as required to accommodate melt index variations.

For quantitative methods for determining the presence of long chain branching, see, for example, U.S. Pat. Nos. 5,272,236 and 5,278,272; Randall (Rev. Macromol. Chem. Phys., C29 (2&3), p. 285–297), which discusses the measurement of long chain branching using $^{13}$C nuclear magnetic resonance spectroscopy, Zimm, G. H. and Stockmayer, W. H., J. Chem. Phys., 17, 1301 (1949); and Rudin, A., Modern Methods of Polymer Characterization, John Wiley & Sons, New York (1991) pp. 103–112, which discuss the use of gel permeation chromatography coupled with a low angle laser light scattering detector (GPC-LALLS) and gel permeation chromatography coupled with a differential viscometer detector (GPC-DV).

A. Willem deGroot and P. Steve Chum, both of The Dow Chemical Company, at the Oct. 4, 1994 conference of the Federation of Analytical Chemistry and Spectroscopy Society (FACSS) in St. Louis, Missouri, presented data demonstrating that GPC-DV is a useful technique for quantifying the presence of long chain branches in substantially linear ethylene polymers. In particular, deGroot and Chum found that the presence of long chain branches in substantially linear ethylene polymers correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of log ($I_2$, melt index) as a function of log(GPC weight average molecular weight), as determined by GPC-DV, illustrates that the long chain branching aspects (but not the extent of long chain branching) of substantially linear ethylene polymers are comparable to those of high pressure, highly branched low density polyethylene (LDPE) and are clearly distinct from heterogeneously branched ethylene polymers produced using Ziegler-type catalysts (such as linear low density polyethylene and ultra low density polyethylene) as well as from homogeneous linear ethylene polymers (such as Tafmer™ products available from Mitsui Petrochemical Industries and Exact™ products available from Exxon Chemical Company).

Homogeneously branched linear ethylene/α-olefin interpolymers may be prepared using polymerization processes (for example, as described by Elston in U.S. Pat. No. 3,645,992, incorporated herein by reference) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. U.S. Pat. No. 4,937,299 to Ewen et al. and U.S. Pat. No. 5,218,071, to Tsutsui et al., each of which is incorporated herein by reference, disclose the use of catalyst systems based on hafnium for the preparation of homogeneous linear ethylene polymers. Homogeneous linear ethylene/α-olefin interpolymers are currently available from Mitsui Petrochemical Company under the trade name "Tafmer" and from Exxon Chemical Company under the trade name "Exact".

Substantially linear ethylene/α-olefin interpolymers are available from The Dow Chemical Company as Affinity™ polyolefin plastomers. Substantially linear ethylene/α-olefin interpolymers may be prepared in accordance with the techniques described in U.S. Pat. No. 5,272,236 and in U.S. Pat. No. 5,278,272, each of which is incorporated herein by reference.

The homogeneous linear and substantially linear ethylene/α-olefin interpolymers may be suitably prepared using a single site metallocene or a constrained geometry metal complex. Constrained geometry catalysts are disclosed in U.S. application Ser. No. 545,403, filed Jul. 3, 1990 (EP-A-416,815); U.S. application Ser. No. 702,475, filed May 20, 1991 (EP-A-514,828); as well as U.S. Pat. Nos. 5,470,993, 5,374,696, 5,231,106, 5,055,438, 5,057,475, 5,096,867, 5,064,802, and 5,132,380. In U.S. Ser. No. 720, 041, filed Jun. 24, 1991, (EP-A-514,828) certain borane derivatives of the foregoing constrained geometry catalysts are disclosed and a method for their preparation taught and claimed. In U.S. Pat. No. 5,453,410 combinations of cationic constrained geometry catalysts with an alumoxane were disclosed as suitable olefin polymerization catalysts.

Suitable activating cocatalysts and activating techniques have been previously taught with respect to different metal complexes in the following references: EP-A-277,003, U.S. Pat. No. 5,153,157, U.S. Pat. No. 5,064,802, EP-A-468,651 (equivalent to U.S. Ser. No. 07/547,718), EP-A-520,732 (equivalent to U.S. Ser. No. 07/876,268), WO 95/00683 (equivalent to U.S. Ser. No. 08/82,201), and EP-A-520,732 (equivalent to U.S. Ser. No. 07/884,966 filed May 1, 1992.

Catalysts found to be particularly suitable in the preparation of substantially linear ethylene/α-olefin interpolymers include, for instance, the catalysts described in the Examples set forth below, as activated by trispentafluorophenylborane and triisobutylaluminum modified methylalumoxane cocatalysts.

The molar ratio of metal complex: activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the titanium:boron:aluminum molar ratio is typically from 1:10:50 to 1:0.5:0.1, most typically from about 1:3:5.

A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal) :support from 1:100,000 to 1:10, more preferably from 1:50,000 to 1:20, and most preferably from 1:10,000 to 1:30. In most polymerization reactions the molar ratio of catalyst:polymerizable compounds employed is from $10^{-12}$:1 to $10^{-1}$:1, more preferably from $10^{-9}$:1 to $10^{-5}$:1.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of a dry, inert gas such as, for example, nitrogen.

The polymerization may be carried out as a batchwise or a continuous polymerization process, with continuous polymerization processes being required for the preparation of substantially linear polymers. In a continuous process, ethylene, comonomer, and optionally solvent and diene are continuously supplied to the reaction zone and polymer product continuously removed therefrom.

In general, the first polymer may be polymerized at conditions for Ziegler-Natta or Kaminsky-Sinn type polymerization reactions, that is, reactor pressures ranging from atmospheric to 3500 atmospheres. The reactor temperature should be greater than 80° C., typically from 100° C. to 250° C., and preferably from 100° C. to 150° C., with temperatures at the higher end of the range, and the temperatures greater than 100° C. favoring the formation of lower molecular weight polymers.

In conjunction with the reactor temperature, the hydrogen:ethylene molar ratio influences the molecular weight of the polymer, with greater hydrogen levels leading to lower molecular weight polymers. When the desired polymer has an $I_2$ of 1 g/10 min, the hydrogen:ethylene molar ratio will typically be 0:1. When the desired polymer has an $I_2$ Of 1000 g/10 min., the hydrogen:ethylene molar ratio will typically be from 0.45:1 to 0.7:1. The upper limit of the hydrogen:ethylene molar ratio is from 2.2 to 2.5:1.

Generally the polymerization process is carried out with a differential pressure of ethylene of from 10 to 1000 psi (70 to 7000 kPa), most preferably from 40 to 60 psi (30 to 300 kPa). The polymerization is generally conducted at a temperature of from 80 to 250° C., preferably from 90 to 170° C., and most preferably from greater than 95° C. to 140° C.

In most polymerization reactions the molar ratio of catalyst:polymerizable compounds employed is from $10^{-12}$:1 to $10^{-1}$:1, more preferably from $10^{-9}$:1 to $10^{-5}$:1. Solution polymerization conditions utilize a solvent for the respective components of the reaction. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and Isopar-E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from 2.5:1 to 12:1, beyond which point catalyst efficiency suffers. The most typical solvent:ethylene ratio (weight basis) is in the range of from 5:1 to 10:1.

The ethylene/α-olefin interpolymer may alternatively be prepared in a gas phase polymerization process, using the catalysts as described above as supported in an inert support, such as silica. The ethylene/α-olefin interpolymer may further be made in a slurry polymerization process, using the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

A typical liner, with a total thickness of 2 mm, of the invention will be characterized as having a flexural modulus, as determined in accordance with ISO 178, of no more than 118 MPa as a mean value, preferably of no more than 80 MPa. The liners of the invention will be characterized as having an Impact Resistance at −10° C., as determined in accordance with ISO 6603, of at least 35 J/mm, more preferably at least 50 J/mm.

The following examples are provided to illustrate typical embodiments of the invention, and are not intended to serve as limits as to its scope.

The following materials are employed in the preparation of the liners of the examples:

TABLE 1

Ingredients Utilized

| | |
|---|---|
| Polymer 1 | Attane 4100 ultralow density linear low density polyethylene, a heterogeneous ethylene/1-octene copolymer having a density of 0.912 g/cm$^3$ and a melt index of 1.0 g/10 min., which is available from The Dow Chemical Company. |
| Polymer 2 | Affinity VP8770 polyolefin plastomer, a substantially linear ethylene/1-octene copolymer having a density of 0.885 g/cm$^3$, a melt index of 1.0 g/10 min., which is available from The Dow Chemical Company. |
| Polymer 3 | Affinity SL 1170 polyolefin plastomer, a substantially linear ethylene/1-octene copolymer having a density of 0.912 g/cm$^3$, a melt index of 1.5 g/10 min., and an $I_{10}/I_2$ of 7.5, which is available from The Dow Chemical Company. |
| Polymer 4 | Affinity EG 8100 polyolefin plastomer, a substantially linear ethylene/1-octene copolymer having a density of 0.870 g/cm$^3$, a melt index of 1.0 g/10 min., and an $I_{10}/I_2$ of 7.3, which is available from The Dow Chemical Company. |
| MB-81 | Luvogard MB 81/PE, which is a brominated flame retardant compound (82 percent bromine content), using low density polyethylene as a carrier, having a density of 2.35 g/cm$^3$, which is available from Lehmann & Voss & Co. |
| White MB | Polybatch White NG 8250, containing TiO$_2$ (rutile type) in polyethylene, having a density of 1.74 g/cm$^3$, which is available from Schulman. |
| CB MB | Polyplast FC 7301 LD carbon black additive, containing 40 percent carbon black in polyethylene, having a density of 1.14 g/cm$^3$, which is available from the Polyplast Muller GmbH. |
| FR batch | Amgard NL ethylene-diamine-phosphate, having a density of 1.56 g/mL, a phosphorus content of 15.6 percent, and a nitrogen content of 27.5 percent, available from the Albright & Wilson GmbH. |

Density is measured in accordance with ASTM D792 in which the samples are annealed at ambient temperature for 24 hours before the measurement is taken.

Melt index ($I_2$) is measured in accordance with ASTM D-1238, at a temperature of 190° C., and using a weight of 2.16 kg (in the case of $I_2$) and 5 kg (in the case of $I_5$)

Ignition resistance is measured in accordance with DIN 4102.

Modulus is determined in accordance with ISO 5272961.

Yield and ultimate tensile strength, yield and ultimate elongation, and toughness are determined in accordance with ISO 5272961.

Hardness Shore A and Hardness Shore D are determined in accordance with ISO 868.

ISO Impact E is determined in accordance with ISO 18093.

Impact at −10° C. is determined in accordance with ISO 6603.

Flexural modulus is determined in accordance with ISO 178.

Modulus (man Young) is determined in accordance with ISO 178.

Displacement, strain, stress, and load at yield are determined in accordance with ISO 178.

Tear Propagation is measured in accordance with the following procedures. Load thickness at maximum load is measured in accordance with ASTM D-1004/DIN 53515. Energy at break point is measured in accordance with ASTM D-1004/ DIN 53515. Peak absolute is measured in accordance with ASTM D-1004/DIN 53515.

EXAMPLE 1

Preparation of a Coextruded A/B Liner

In the screw unit of a first extruder, 88.5 weight percent Polymer 1, 10 weight percent MB-81, and 1.5 weight percent White-MB are melt blended to form a first homogeneous mixture.

In the screw unit of a second extruder, 89 weight percent Polymer 2, 10 weight percent MB-81, and 1 weight percent CB-MB are melt blended to form a second homogeneous mixture.

The liner comprising the first (A) layer and the second (B) layer is formed by coextruding the first and second homogeneous mixtures, respectively. The thickness of the A layer, comprising the first homogeneous mixture, is 250 microns. The thickness of the second layer, comprising the second homogeneous mixture, is 1.75 mm.

The liner is evaluated for certain performance attributes, which are set forth in Table Two, following Example Two.

EXAMPLE 2

Preparation of a Coextruded A/B/A Liner

In the screw unit of first and third extruders, 89 weight percent Polymer 1, 10 weight percent FR-batch, and 1 weight percent White-MB are melt blended to form first and third homogeneous mixtures.

In the screw unit of a second extruder, 89 weight percent Polymer 2, 10 weight percent FR-batch, and 1 weight percent White MB are melt blended to form a second homogeneous mixture.

The liner comprising the first and third (A) layers and the second (B) layer is formed by coextruding the first, second, and third homogeneous mixtures, respectively. The thickness of the A layers, comprising the first and third homogeneous mixtures, is 200 microns. The thickness of the second layer, comprising the second homogeneous mixture, is 1.60 mm.

The liner is evaluated for certain performance attributes, which are set forth in Table Two.

TABLE 2

Properties of A/B and A/B/A Liners

|  | Liner 1 (A/B) | Liner 2 (A/B/A) |
| --- | --- | --- |
| Modulus, MD (N/mm$^2$) | 34.1 ± 1.5 | 44.6 ± 3 |
| Modulus, CD (N/mm$^2$) | 35.5 ± 0.7 | 35.5 ± 0.09 |
| Yield Tensile Strength, MD (N/mm$^2$) | 3.3 ± 0.2 | 3.5 ± 0.09 |
| Yield Tensile Strength, CD (N/mm$^2$) | 3.4 ± 0.1 | 3.7 ± 0.05 |
| Ultimate Tensile Strength, MD (N/mm$^2$) | 28.8 ± 2.8 | 29.2 ± 0.6 |
| Ultimate Tensile Strength, CD (N/mm$^2$) | 27.5 ± 1.9 | 34.6 ± 2 |
| Yield Elongation, MD (percent) | 18.8 ± 4.3 | 15.5 ± 1 |
| Yield Elongation, CD (percent) | 18.7 ± 3 | 19.5 ± 1 |
| Ultimate Elongation, MD (percent) | 956.9 ± 29.4 | 952.1 ± 24.2 |
| Ultimate Elongation, CD (percent) | 941.4 ± 22.5 | 1019 ± 18 |
| Toughness, MD (Nmm/mm$^3$) | 105.7 ± 9 | 107.7 ± 6.2 |
| Toughness, CD (Nmm/mm$^3$) | 100.6 ± 5.9 | 126.9 ± 6.4 |
| Impact at −10° C. (J/mm) | 34.5 | 50.4 |
| Flexural modulus MD/CD (MPa) |  | 101.26 ± 3.24/ 122.96 ± 6.04 (average of 112 MPa) |
| Flexural modulus (measured from the A-side of the liner) MD/CD (MPa) | 60.33 ± 8.35 59.24 ± 3.10 (average of 60 MPa) |  |
| Flexural modulus (measured from the B-side of the liner) MD/CD (MPa) | 79.08 ± 11.31 81.82 ± 2.58 (average of 161 MPa) |  |

As seen above, both liner 1 and liner 2 exhibit an average flexural modulus of no more than 150 MPa, with liner 2 having an average of 112 MPa and liner 1 having an average of 110 MPa ((161+60)/2).

In the case of the A/B structure of liner 1, the liner has an average flexural modulus of no more than 90 MPa, that is, an average flexural modulus of about 80 MPa, when measured from side of the more flexible B layer; the liner further has an average flexural modulus of no more than 70 MPa, when measured from the side of the less flexible A layer.

In the case of the A/B/A structure of liner 2, the liner has an average flexural modulus in the cross direction of no more than 130 MPa; the liner further has an average flexural modulus in the machine direction of no more than 110 MPa.

For the purpose of comparison, a 2 mm thick film comprising 88.5 weight percent Polymer 1, 10 weight percent MB-81, and 1.5 weight percent White-MB exhibits an Impact at −10° C. of 23.1 J/mm and a flexural modulus of 185 MPa.

EXAMPLES 3 AND 4

Preparation of A/B/A Liners Utilizing a Substantially Linear Polymer in Each Layer In the case of the liner of Example 3, in the screw unit of first and third extruders, 83 weight percent Polymer 3, 16 weight percent MB-81, and 1 weight percent White-MB are melt blended to form first and third homogeneous mixtures. In the screw unit of a second extruder, 83 weight percent Polymer 4, 16 weight percent FR-batch, and 1 weight percent CB-MB are melt blended to form a second homogeneous mixture.

In the case of the liner of Example 4, in the screw unit of first and third extruders, 89 weight percent Polymer 3, 10 weight percent of MB-81, and 1 weight percent White-MB are melt blended to form first and third homogeneous mixtures. In the screw unit of a second extruder, 89 weight percent Polymer 4, 10 weight percent FR-batch, and 1 weight percent CB-MB are melt blended to form a second homogeneous mixture.

The liners comprising the first and third (A) layers and the second (B) layer are formed by coextruding the first, second, and third homogeneous mixtures, respectively. In the case of the liners of each of Examples 3 and 4, the thickness of the A layers, comprising the first and third homogeneous mixtures, is 100 microns, and the thickness of the second layer, comprising the second homogeneous mixture, is 1.8 mm. The liners each have an overall thickness of 2 mm.

The liners of Examples 3 and 4 are evaluated for certain performance attributes, which are set forth in Table Three.

TABLE 3

Properties of Liners Which Comprise a Substantially Linear Polymer in Each Layer

|  | Liner 3 | Liner 4 |
| --- | --- | --- |
| Modulus, MD (N/mm$^2$) | 14.3 | 30.1 |
| Modulus, CD (N/mm$^2$) | 13.6 | 30.2 |
| Yield Tensile Strength, MD (N/mm$^2$) | 1.6 | 1.97 |
| Yield Tensile Strength, CD (N/mm$^2$) | 1.6 | 2.1 |
| Ultimate Tensile Strength, MD (N/mm$^2$) | 1.6 | 14.5 |
| Ultimate Tensile Strength, CD (N/mm$^2$) | 1.6 | 15.8 |
| Yield Elongation, MD (percent) | 18.7 | 11.7 |
| Yield Elongation, CD (percent) | 19.2 | 17.2 |
| Ultimate Elongation, MD (percent) | 1038 | 964.2 |
| Ultimate Elongation, CD (percent) | 1074 | 1046 |
| Toughness, MD (Nmm/mm$^3$) | 62.9 | 65.5 |
| Toughness, CD (Nmm/mm$^3$) | 64.8 | 71.8 |
| Hardness Shore A | 81 | 83.9 |
| ISO Impact E (ISO 18093) (mJ/mm) | no break |  |
| Flexural Modulus between 0.5 and 0.75 mm(Mpa) (Liner 4 MD/CD) | 35.06 | 66.3/76.3 (average of 71.3) |
| Modulus (man Young) (0.5–0.75 mm) (Mpa) (Liner 4 MD/CD) | 37.94 | 244.9/252.2 |
| Displacement at Yield (mm) (Liner 4 MD/CD) | 16.21 | 16.8/15.6 |
| Strain at Yield (percent) (Liner 4 MD/CD) | 4.7 | 4.8/4.5 |
| Stress at Yield (MPa) (Liner 4 MD/CD) | 1.029 | 1.9/2 |
| Load at Yield (N) (Liner 4 MD/CD) | 0.4388 | 0.798/0.85 |
| I$_5$ 190° C., 5 kg (g/10 minutes) | 3.15 | 3.17 |
| I$_2$ 190° C., 2.16 kg (g/10 minutes) |  | 1.13 |
| Density at 23° C. (g/cm$^3$) | 0.9626 | 0.92 |
| OIT at 200° C. (minutes) | 16/17 | 9 |

As shown above, liners 3 and 4, each of which utilize A and B layers which comprise a substantially linear ethylene polymer, exhibit an average flexural modulus of no more than 80 MPa (in the case of liner 4), and of no more than 40 MPa (in the case of liner 3).

In addition, in the case of the liner of Example 4, tear propagation measurements were made, the results of which are set forth in the following Table Four.

TABLE 4

Tear Propagation Properties of the Liner of Example 4

|  | MD | CD |
|---|---|---|
| Load Thickness at Maximum Load (N/mm) | 36.2 | 41.17 |
| Energy at Break Point (J) | 2.95 | 3.08 |
| Peak Absolute (N) | 71.58 | 80.6 |

EXAMPLES 5–7

Comparison of Ignition Resistance Additives

In the case of Examples 5–7, 2 mm thick monolayer films are prepared, utilizing Polymer 2, carbon black, a selected ignition resistance additive, and, in the case of Example 5, Aerosil R972. The liners are evaluated for flame retardancy utilizing the LOI test described above. The composition of the liners, the oxygen consumption, and the burn time are set forth in the following Table Five.

TABLE 5

| Example | Composition | Oxygen Consumption | Burn time (seconds) | Comments |
|---|---|---|---|---|
| 5 | 87.5 weight percent Polymer 2, 1 weight percent carbon black, 10 weight percent MB-81, 1.5 weight percent Aerosil R972 | 23.5 | 27 | No smoke or foam |
| 6 | 69 weight percent Polymer 2, 1 weight percent carbon black, 30 weight percent Amgard NL | 26.9 | 51 | No dripping |
| 7 | 79 weight percent Polymer 2, 1 weight percent carbon black, 20 weight percent Amgard CPC 105 | 20.4 | 162 | |

Each of the Examples set forth in Table Five is compliant with DIN 4102, having attained a rating of B1.

What is claimed is:

1. A liner, comprising:
   a. at least one first layer comprising at least 40 weight percent of a first polymer component which comprises at least one first ethylene/-olefin interpolymer which is a homogeneous linear or substantially linear ethylene/-olefin interpolymer having a density of from 0.850 g/cm$^3$ to 0.920 g/cm$^3$,
   b. at least one second layer comprising at least 40 weight percent of a second polymer component which comprises at least one second ethylene/-olefin interpolymer having a density of from 0.905 g/cm$^3$ to 0.935 g/cm$^3$, provided that the density of the at least one second ethylene/-olefin interpolymer is at least 0.002 g/cm$^3$ greater than the density of the at least one first ethylene/-olefin interpolymer,
   wherein the liner has a total thickness of 0.3 to 4 mm, and exhibits a flexural modulus, as determined in accordance with ISO 178, of no more than 150 MPa and an Impact Resistance at −10° C., as determined in accordance with ISO 6603, of at least 35 J/mm.

2. The liner of claim 1, wherein the linear comprises an ignition resistant additive, whereupon the linear exhibits an ignition resistance of B1, as determined in accordance with DIN 4102.

3. The liner of claim 2, wherein the ignition resistant additive is provided in an amount of from 1 to 35 weight percent, based on the total weight of the liner.

4. The liner of claim 2, wherein the ignition resistant additive is provided in an amount of from 1 to 35 weight percent, based on the total weight of the liner.

5. The liner of claim 2, wherein the ignition resistant additive is provided to each layer in an amount of from 7 to 13 weight percent, based on the total weight of the layer.

6. The liner of claim 2, wherein the ignition resistant additive is selected from the group consisting of halogenated ignition resistant additives and intumescent ignition resistant additives.

7. The liner of claim 1, wherein the at least one first ethylene/-olefin interpolymer has a density of from 0.87 to 0.89 g/cm$^3$.

8. The liner of claim 1, wherein the at least one first ethylene/-olefin interpolymer is characterized as having an $M_w/M_n$ of from 1.5 to 2.5.

9. The liner of claim 1, wherein the at least one first ethylene/-olefin interpolymer is prepared using a single site metallocene or constrained geometry catalyst.

10. The liner of claim 1, wherein the at least one second ethylene/-olefin interpolymer has a density of from 0.900 to 0.920 g/cm$^3$.

11. The liner of claim 1, wherein the at least one second ethylene/-olefin interpolymer is a heterogeneous linear polymer or a homogeneous linear or substantially linear polymer.

12. The liner of claim 1, wherein at least one of the at least one first or second ethylene/-olefin interpolymers is an interpolymer of ethylene and at least one $C_3$–$C_{20}$-olefin.

13. The liner of claim 12, wherein the at least one $C_3$–$C_{20}$-olefin is selected from the group consisting of propylene, 1-butene, 1-pentene, and 1-octene.

14. The liner of claim 12, wherein at least one of first or second ethylene/-olefin interpolymers is an interpolymer of ethylene, at least one $C_3$–$C_{20}$-olefin, and at least one diene.

15. The liner of claim 1, comprising at least one abuse resistant layer, wherein the thickness of the first layer and the thickness of each abuse resistant layer is selected such that the thickness ratio is from 1:1 to 15:1.

16. The liner of claim 15, wherein the thickness of the first layer and the thickness of each abuse resistant layer is selected such that the thickness ratio is from 5:1 to 12:1.

17. The liner of claim 16, wherein the thickness of the first layer and the thickness of each abuse resistant layer is selected such that the thickness ratio is from 6:1 to 10:1.

18. The liner of claim 1, wherein the liner comprises one first layer and two second abuse resistant layers, which are configured such that the first layer is between and adjacent to each of the second layers.

19. The liner of claim 1, wherein the liner has a total thickness of from 1.5 to 2.5 mm.

20. The liner of claim 1, characterized as having an average flexural modulus of no more than 130 Mpa, as determined in accordance with ISO 178.

21. The liner of claim 1, wherein the first layer comprises from 40 to 99 weight percent of the first polymer component.

22. The liner of claim 1, wherein the first layer comprises from 60 to 97 weight percent of the first polymer component.

23. The liner of claim 1, wherein the first layer comprises from 87 to 93 weight percent of the first polymer component.

24. The liner of claim 1, wherein the at least one second layer comprises from 40 to 99 weight percent of the second polymer component.

25. The liner of claim 1, wherein the at least one second layer comprises from 60 to 97 weight percent of the second polymer component.

26. The liner of claim 1, wherein the at least one second layer comprises from 87 to 93 weight percent of the second polymer component.

27. The liner of claim 1, wherein the first polymer component comprises from 5 to 75 weight percent of an additional thermoplastic polymer.

28. The liner of claim 1, wherein the second polymer component comprises from 5 to 60 weight percent of an additional thermoplastic polymer.

29. The liner of claim 1, further comprising from 5 to 60 weight percent of a short fiber reinforcing material, based on the total weight of the liner.

30. The liner of claim 27, wherein the short fiber reinforcing material is selected from the group consisting of glass fibers, carbon fibers, aramid fibers, polyester fibers, polyamide fibers, or polyolefin fibers.

31. The liner of claim 1, further comprising a reinforcing nonwoven or woven fibrous mat.

* * * * *